United States Patent
Steiner et al.

(10) Patent No.: US 9,124,702 B2
(45) Date of Patent: Sep. 1, 2015

(54) STRATEGY PAIRING

(71) Applicant: Avaya Inc., Basking Ridge, NJ (US)

(72) Inventors: Robert C. Steiner, Broomfield, CO (US); Gene Masaru Uba, Broomfield, CO (US); Michael Hartman, Ottawa, CA (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 14/071,368

(22) Filed: Nov. 4, 2013

(65) Prior Publication Data

US 2015/0124954 A1    May 7, 2015

(51) Int. Cl.
*H04M 3/00*     (2006.01)
*H04M 3/523*    (2006.01)

(52) U.S. Cl.
CPC .......... *H04M 3/5233* (2013.01); *H04M 3/5235* (2013.01)

(58) Field of Classification Search
CPC ..... H04M 3/5175; H04M 3/523; H04M 3/51; H04M 3/5233; H04M 3/5232
USPC .............. 379/265.01–265.02, 265.12–265.14
See application file for complete search history.

(56) References Cited

U.S. PATENT DOCUMENTS

| | | |
|---|---|---|
| 8,744,890 B1 * | 6/2014 | Bernier et al. ............... 705/7.16 |
| 2010/0235218 A1 | 9/2010 | Erhart et al. |
| 2011/0125793 A1 | 5/2011 | Erhart et al. |
| 2011/0125826 A1 | 5/2011 | Erhart et al. |
| 2011/0255683 A1 | 10/2011 | Flockhart et al. |
| 2012/0078685 A1 * | 3/2012 | Krebs et al. ................... 705/7.37 |
| 2012/0296417 A1 | 11/2012 | Hill et al. |

* cited by examiner

*Primary Examiner* — Rasha Al Aubaidi
(74) *Attorney, Agent, or Firm* — Sheridan Ross P.C.

(57) ABSTRACT

A contact center is described as having the ability to simultaneously consider a plurality of different work assignment strategies. Specifically, a work assignment engine in the contact center is enabled to create merged strategies from work-finding-agent strategies and agent-finding-work strategies to determine if one such strategy contradicts the other strategy.

20 Claims, 6 Drawing Sheets

STRATEGY PAIRING

FIELD OF THE DISCLOSURE

The present disclosure is generally directed toward communications and more specifically toward contact centers.

BACKGROUND

In a contact center, tasks are specific operations that are performed by a work assignment engine. Examples of tasks that are often performed by a work assignment engine include, without limitation, score work, score resource, qualify work, qualify resource, match work and resource, queue, de-queue, remove, etc.

During work assignment in a contact center, the work assignment engine is currently designed to consider either a work's assignment strategy or a resource's assignment strategy. Some times the work's assignment strategy aligns or cooperates with a resource's assignment strategy whereas other times the two strategies may conflict with one another, and the conflict may be partial or total. Unfortunately, if the work assignment engine is only capable of considering one of the two strategies, the work assignment engine may assign work to a resource, or vice versa, which violates the assignment strategy that was not considered.

Consider the following example. Work enters a contact center with a first strategy (e.g., a work-finding-agent strategy) and the first strategy defines that the work should be assigned to an agent located in the United States. Meanwhile, an agent in India becomes available and the newly-available agent has a second strategy (e.g., an agent-finding-work strategy). Consider further that the second strategy (e.g., the agent-finding-work strategy) defines that the agent should be assigned to the next available piece of work having a technical question of a particular nature. If the work having the first strategy satisfies the second strategy and the work assignment engine only considers the second strategy, then the work will be assigned to the agent in India even though the first strategy (e.g., the work-finding-agent strategy) indicated that such an assignment should not occur.

In the past, the concept of queues would effectively deal with this problem. Specifically, if a queue did not exist to accommodate a particular strategy, then a new queue would be created. This queuing inherently limits the available resources that can service the queue. Multi-queuing a contact expands the pool of available resources, but removes control of who gets the work, thereby increasing the likelihood that the work will be assigned to a resource in contradiction to a work-finding-agent strategy. The current solutions hide the problem as they are too restrictive. More problematic, is that reliance on queues to solve the above problem causes the contact center to become over populated with queues, which can significantly increase customer wait time to unacceptable levels, thereby reducing customer satisfaction. Furthermore, as queueless contact centers continue to develop and gain acceptance in the marketplace, the work assignment engine can no longer rely on the inherent control obtained through the use of queues.

SUMMARY

It is with respect to the above-described limitations that embodiments of the present disclosure were contemplated. Specifically, a work assignment engine capable of performing strategy pairing is provided.

In accordance with at least some embodiments of the present disclosure, a strategy is a collection of task mappings where rules or policies are used to determine a priority with which tasks are executed or processed. More specifically, a strategy is a collection of tasks executed in a specific order and a task is a sequence of one or more rules. In the context of a contact center, a work assignment engine is configured to execute strategies. In the context of a contact center, a work assignment engine is configured to execute strategies.

In accordance with at least some embodiments, strategy pairing in a contact center is proposed whereby a work assignment engine is configured to simultaneously consider a plurality of assignment strategies. The types of strategies that may be simultaneously considered by the work assignment engine include work-finding-agent strategies, agent-finding-work strategies, and any other type of strategy known in a contact center.

Strategy pairing can work in a couple of different ways without departing from the scope of the present disclosure: (1) strategy pairing during qualification and/or (2) strategy pairing during scoring.

If a strategy pairing analysis is performed during qualification, then the work assignment engine can be configured to analyze a pool of resources and a pool of work to determine which pieces of work have strategies that conflict with strategies of resources. This analysis can be performed by merging the strategy pairs (a computationally simple operation). Any conflicting strategies between a resource and work may cause the work/resource pair to be considered an unqualified match, thereby eliminating that pair from further consideration by the work assignment engine. In some embodiments, the work assignment engine may analyze the attributes of the work and resource (e.g., processing requirements of work or processing capabilities of resources).

If a strategy pairing analysis is performed during a scoring phase of operation by the work assignment engine, then the overall score of the resource/agent match may be decreased if the strategy pair is incompatible, either partially or completely. In this example, the strategies of the work and resource can be merged (a computationally simple operation) to create a merged strategy that is considered by the work assignment engine. This merged strategy can be created dynamically or during compile time of the work assignment engine. This type of analysis may allow incompatible strategies to be violated, but only if no better work/resource pairing option presents itself. The work assignment engine considers both strategies (e.g., both work-finding-agent strategies and agent-finding-work strategies), and the work assignment engine may conclude that violating one or both strategies is better than not assigning the work to the resource.

In accordance with at least some embodiments of the present disclosure, a method is provided which generally comprises:

receiving a first strategy at a work assignment engine;

receiving a second strategy at the work assignment engine, wherein the second strategy is different from the first strategy;

merging the first strategy with the second strategy to create a merged strategy; and executing the merged strategy at the work assignment engine, wherein executing the merged strategy causes the work assignment engine to make a determination as to whether or not the first strategy conflicts with the second strategy.

In some embodiments, the present disclosure enables a work assignment engine to simultaneously consider an assignment strategy of work and an assignment strategy of a resource (e.g., an agent) to determine whether the work and the resource have conflicting strategies. If conflicting strategies are detected, then the work assignment engine can further determine whether better assignment options exist or whether the work should be disqualified from being assigned to the resource.

As used herein, the term "contradiction" when used in connection with multiple strategies may comprise either a partial or complete contradiction or violation of two or more strategies. In some embodiments, contradictions between strategies can be identified by first making a match with a first strategy. If the same match cannot be made with a second strategy, then the second strategy can be said to contradict the first strategy and vice versa.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
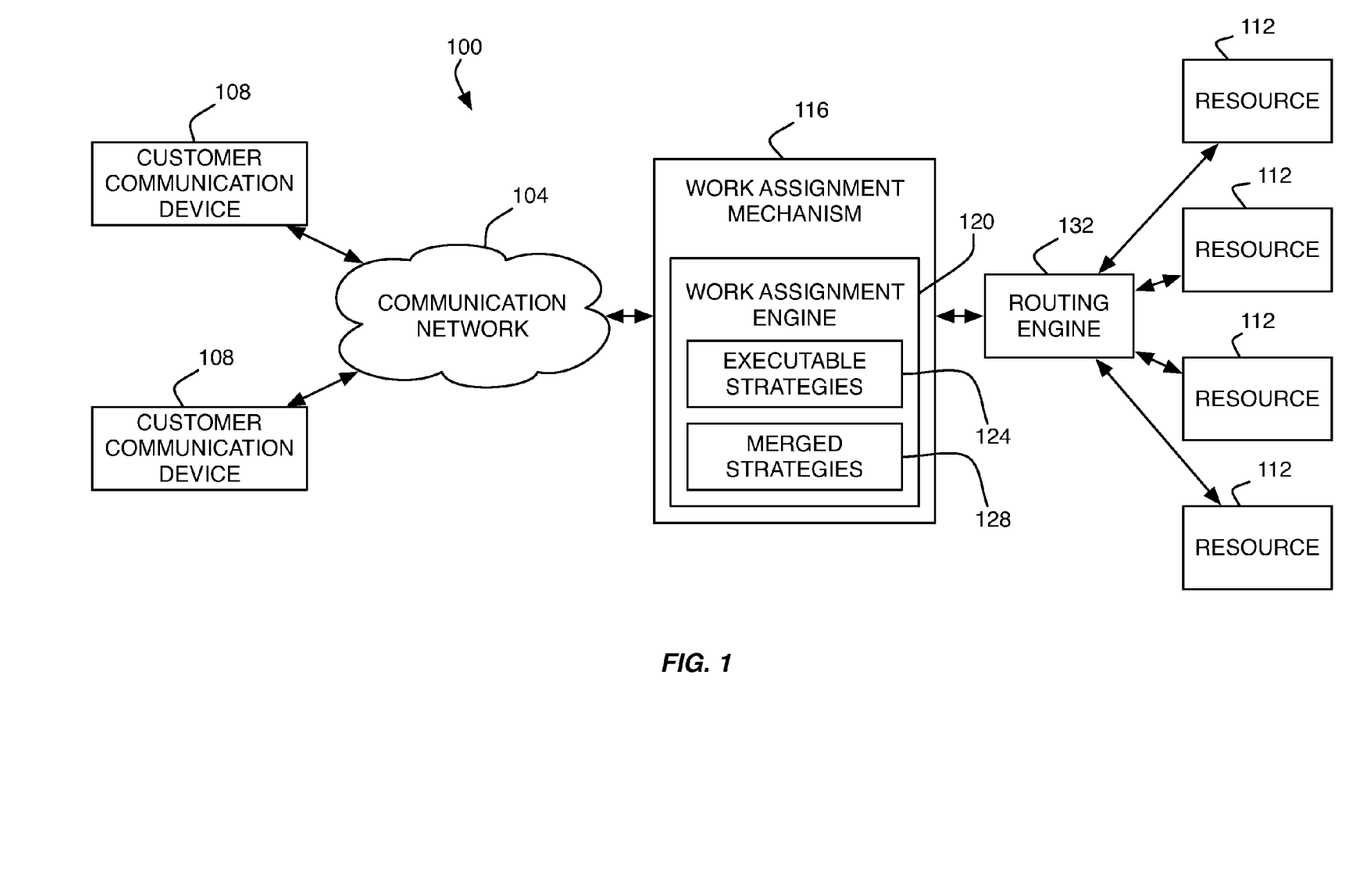
FIG. 1 is a block diagram of a communication system in accordance with embodiments of the present disclosure.

FIG. 1 shows an illustrative embodiment of a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. patent application Ser. No. 12/469,523 to Steiner, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Exemplary architectures for harvesting social media communications and generating work items based thereon are described in U.S. patent application Ser. Nos. 12/784,369, 12/706,942, and 12/707,277, filed Mar. 20, 1010, Feb. 17, 2010, and Feb. 17, 2010, respectively, each of which are hereby incorporated herein by reference in their entirety.

The format of the work item may depend upon the capabilities of the communication device 108 and the format of the communication. In particular, work items are logical representations within a contact center of work to be performed in connection with servicing a communication received at the contact center (and more specifically the work assignment mechanism 116). The communication may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 132 to connect the communication device 108 which initiated the communication with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center.

More specifically, the work assignment engine 120 comprises executable strategies 124 that, when executed, enable the work assignment engine 120 to determine which of the plurality of processing resources 112 is qualified and/or eligible to receive the work item and further determine which of the plurality of processing resources 112 is best suited to handle the processing needs of the work item. In situations of work item surplus, the work assignment engine 120 can also make the opposite determination (i.e., determine optimal assignment of a work item resource to a resource). In some embodiments, the work assignment engine 120 is configured to achieve true one-to-one matching by utilizing bitmaps/tables and other data structures.

In accordance with at least some embodiments of the present disclosure, the work assignment engine 120 may be configured to execute one or several executable strategies 124 to make work assignment decisions. As will be discussed in further detail herein, the work assignment engine 120 may comprise a plurality of executable strategies 124, where one or more of the executable strategies 124 include one or many tasks that are performed by the work assignment engine 120 during execution of the executable strategy 124. The order or manner in which the tasks of a strategy 124 are executed by the work assignment engine 120 may be defined by rules or policies, which may also be included in the executable strategy 120. Non-limiting examples of tasks that can be included in an executable strategy 124 include, without limitation, any of the following actions:

For a Resource: Add, Remove, Change a State (e.g., READY, ON DUTY, NOT READY, etc.), Update, Enable, Disable, Qualify Resource, Qualify Match, Score Resource, Begin, Finish, Set New Best, Enqueue, Dequeue, Accept, Reject, and Timeout For a Work Item: Add, Remove, Update, Cancel, Begin, Finish, Next Evaluation, Find Resource, Qualify Work, Qualify Match, Score Work, Set New Best, Enqueue, Dequeue, Accept, Reject, Requeue, Ready, Not-Ready, Complete, and Time-Out For a Service: Add, Remove, Update, and Enable For Determining a Best Match: Assign Work To Resource, and Determine Well-Matched For Determining Context: Heartbeat Failure, Customer Score, Custom Qualify, Custom Well Matched, Ready Res Service Capabilities, Not Ready Res Service Capabilities, Begin Resume, Begin Service Enable, Metric Sample, Intrinsic Sample, Intrinsic Sample All, Compute Requeue Metrics, Compute Enqueue Metrics, Compute Dequeue Metrics, Add Existing, Completed, Compute Rejected Metrics, Compute Accepted Metrics, Accepted, Rejected, Requeued, Compute Abandoned Metrics, and Compute Completed Metrics As will be discussed in further detail herein, one, some, or all of the executable strategies 124 may be merged with one another (e.g., combined together) to create a merged strategy 128. FIG. 1 shows that the work assignment engine 120 comprises a single merged strategy 128, but it should be appreciated that a larger number of merged strategies 128 may reside within the work assignment engine 120 without departing from the scope of the present disclosure.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

Figure 2:
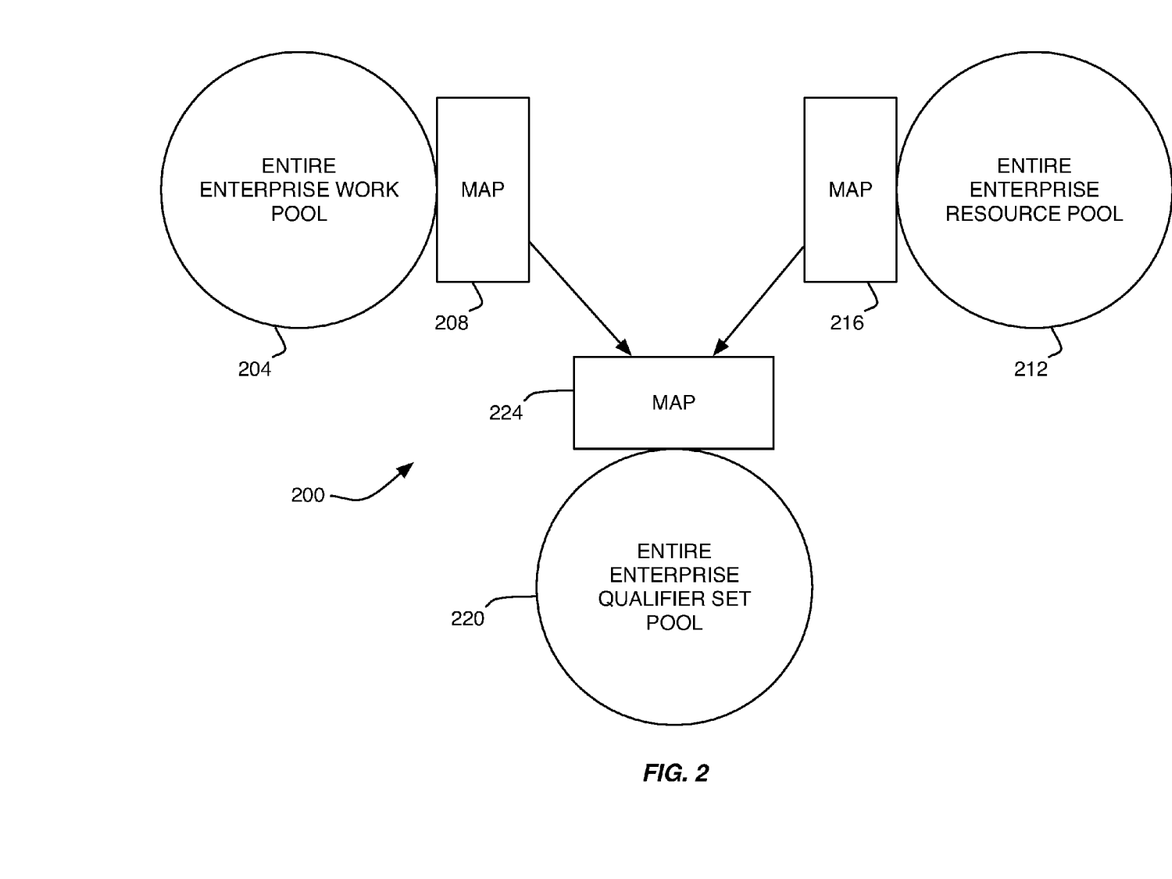
FIG. 2 is a block diagram depicting a logical representation of a queueless contact center and entities within a contact center in accordance with embodiments of the present disclosure.

With reference now to FIG. 2, additional details of data structures that may be sued by the work assignment engine 120 to make work assignment decisions (e.g., decisions resulting from the execution of an executable strategy 124 or merged strategy 128) will be described in accordance with at least some embodiments of the present disclosure. The illustrative data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center 100 at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing the fact that the work item is not assigned to a resource 112, thereby making that resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224. Furthermore, each bitmap 208, 216, 224 may be recalculated every time the state of the contact center changes, every time a new work item enters the contact center, every time a new resource becomes available, etc.

As will be discussed in further detail herein, work from the work pool 204 may have work-finding-agent strategies 124 whereas resources 112 from the resource pool 212 may have agents-finding-work strategies 124. The combination of these strategies may result in the creation of the merged strategies 128, which can be analyzed and executed by the work assignment engine 120 to ensure that work-finding-agent strategies 124 are not executed in contradiction to agent-finding-work strategies 124.

Figure 3:
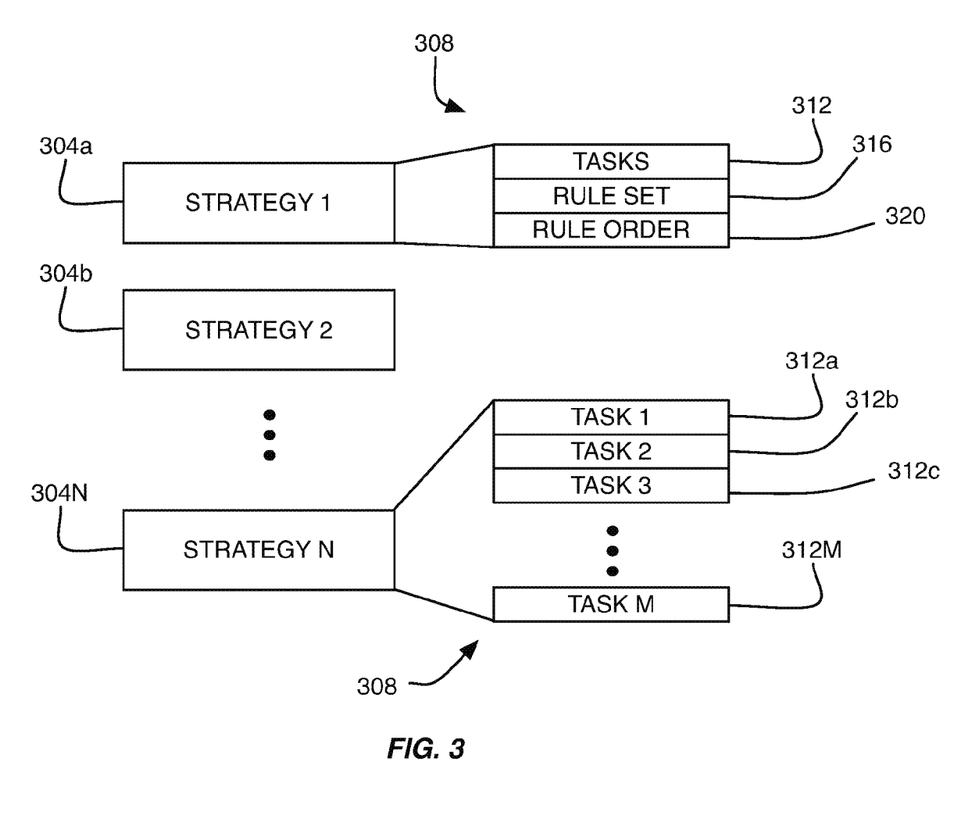
FIG. 3 is a block diagram depicting a plurality of strategies in accordance with embodiments of the present disclosure.

With reference now to FIG. 3, additional details of a strategy 204a-N, which may correspond to one or more of the executable strategies 124, will be described in accordance with at least some embodiments of the present disclosure. It should be appreciated that the strategies 304a-N may correspond to work-finding-agent strategies, agent-finding-work strategies, or merged strategies 128 without departing from the scope of the present disclosure. As shown in FIG. 3, a strategy 304 may comprise a number of components 308 that enable execution of the strategy 304 by the work assignment engine 120. In some embodiments, a strategy 304 may include one or more tasks 312, one or more rules sets 316, a rule order 320, and one or more added rules 324.

As discussed above, the strategy 312 may comprise any number of tasks 312 that can be performed concurrently or sequentially when executing a strategy 304. The manner, order, or priority with which the tasks 312 are performed may be dictated by the rules laid out in the rule set 316. For instance, the rule set 316 may comprise conditions under which a task 312 should or should not be performed. The conditions defined within a rule set 316 may be related to whether or not other tasks have already been performed, the results of executing such tasks, external conditions (e.g., contact center state, resource status, etc.), and combinations thereof. The rule order 320 may define the order in which certain rule sets 316 are analyzed and rules can be added 324 by an administrator of the contact center.

Alternatively or additionally, a strategy 304 may only comprise a number of tasks 312a-M that are sequentially performed during execution of the strategy. More specifically, the tasks 312a-M of a strategy 304 may be hierarchically ordered such that a first task 312a in the set of tasks is performed prior to a second task 312b, which is performed prior to a third task 312c, and so forth. In this way, the rules for performing the tasks 312a-M are inherently defined by the ordering of the tasks 312a-M in the strategy 304. As will be described in further detail herein, the ordering of tasks 312a-M and/or the rule sets 316 defining when tasks are performed may be administratively adjusted for a single strategy 304 or multiple strategies 304.

Figure 4:
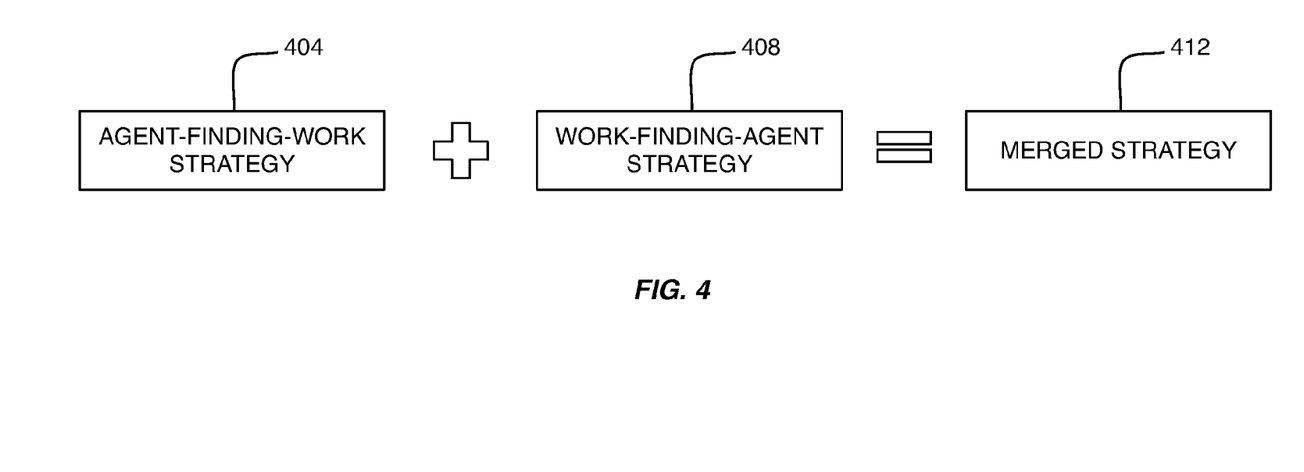
FIG. 4 is a block diagram depicting a merged strategy in accordance with embodiments of the present disclosure.

Referring now to FIG. 4, a non-limiting example of a merged strategy 412 will be described in accordance with at least some embodiments of the present disclosure. The merged strategy 412 may be similar or identical to the merged strategy 128 depicted in FIG. 1. It should also be appreciated that the merged strategy 412 can be created during run-time, during compile time, and/or during simulations. In other words, the merged strategy 412 may be created at any time and data analysis may be performed with a simulated execution of strategies rather than an actual execution of strategies. Moreover, the analysis of a merged strategy 412 can be performed at any time and the analysis of the merged strategy 412 can correspond to an analysis of a merged strategy 412 created during run-time, compile time, and/or during simulations.

In some embodiments, the merged strategy 412 corresponds to a combination of an agent-finding-work strategy 404 and a work-finding-agent strategy 408. The strategies 404, 408 may be combined by a logical operator (e.g., AND, OR, NAND, etc.). Additionally or alternatively, the merged strategy 412 may correspond to a sequential or serial execution of both strategies 404, 408. For instance, the work assignment engine 120 may execute the merged strategy 412 by first executing the agent-finding-work strategy 404 and then executing the work-finding-agent strategy 408 and then checking to see if the first execution contradicts the second execution. In other embodiments, the work assignment engine 120 may be configured to analyze the components of the merged strategy 412 to determine if one of the components (e.g., an agent-finding-work strategy 404) contradicts another of the components (e.g., a work-finding-agent strategy 408). As a more specific example, the work assignment engine 120 may execute one strategy and check to see if the results of the first strategy execution contradict a condition in the other strategy. Thereafter, the work assignment engine 120 may execute the other strategy and check to see if the results of the second strategy's execution contradicts a condition in the first strategy. Contradiction may be defined as one strategy completely contradicting another strategy (e.g., execution of one strategy is a direct contradiction to the other strategy). Contradiction, may additionally or alternatively be defined as a partial contradiction where execution of one strategy results in a decision that ignores or contradicts a portion of the other strategy.

Figure 5:
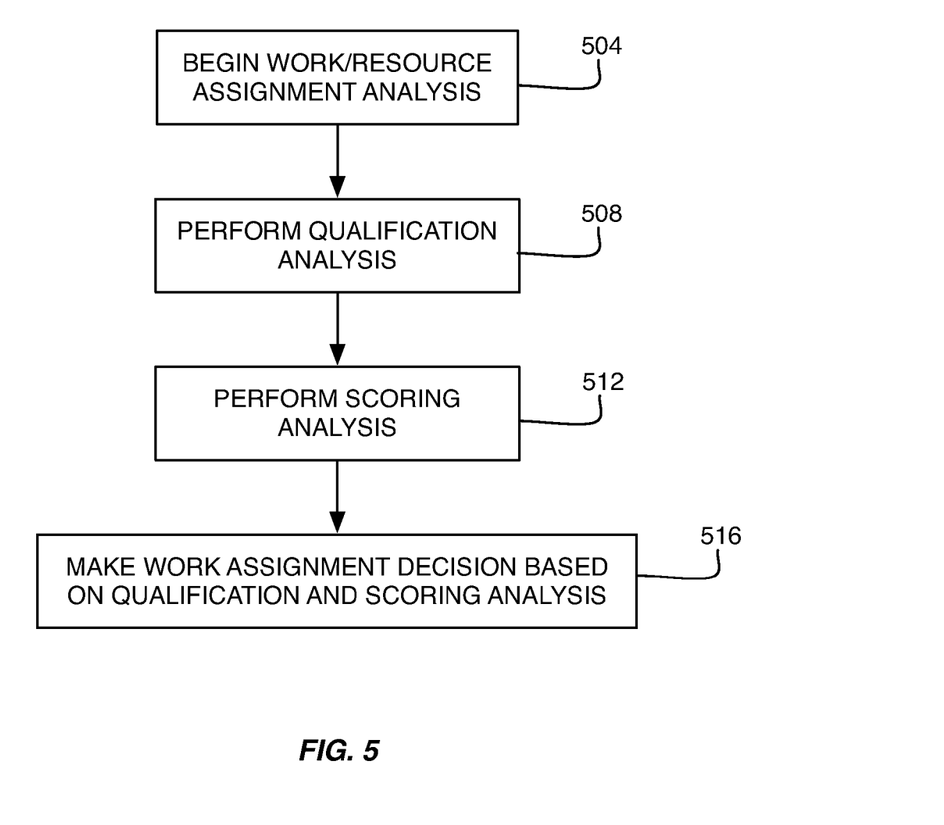
FIG. 5 depicts a work assignment method in accordance with embodiments of the present disclosure.

With reference now to FIG. 5, a method of making work assignment decisions (e.g., matching work with resources and/or agents) will be described in accordance with at least some embodiments of the present disclosure. The method begins with the work assignment engine 120 analyzing the entirety of the work pool 204, resource pool 212, and/or qualifier set pool 220 to determine which resources and/or work are available for consideration (step 504). The work assignment engine 120 continues by performing a qualification analysis between the work and resources/agents (step 508). In this step, the work assignment engine 120 is determining whether agents and/or resources are qualified (e.g., allowed or disallowed) to handle a piece of work. This qualification analysis may depend upon a state of the resource (e.g., whether the resource is available, unavailable, etc.), a state of the work, attributes of the resource (e.g., skills, language capabilities, etc.), attributes of the work (e.g., processing requirements, language capabilities, etc.), or combinations thereof.

During the qualification step, the work assignment engine 120 may be allowed to remove a large number of work items and/or resources from further consideration, thereby reducing further processing. After qualification, the method may continue with the work assignment engine 120 performing a scoring analysis of the work and resources/agents (step 512). In this step, the work assignment engine 120 may further analyze the attributes of the work and resources/agents to determine a best work item for a resource, or vice versa. In particular, the work assignment engine 120 may determine, based on attributes of the work items and resources, match scores for each potential work/resource pair that have passed the qualification analysis.

Following the scoring analysis, the work assignment engine 120 is allowed to make a work assignment decision in accordance with the qualification and scoring analyses performed (step 516). As will be discussed in further detail herein, the work assignment engine 120 may be configured to analyze merged strategies 128, 412 during the qualification analysis (step 508) and/or scoring analysis (step 512) to determine if a work-finding-agent strategy 408 contradicts an agent-finding-work strategy 404 and, if so, whether to make a work assignment decision even with such a contradiction.

Figure 6:
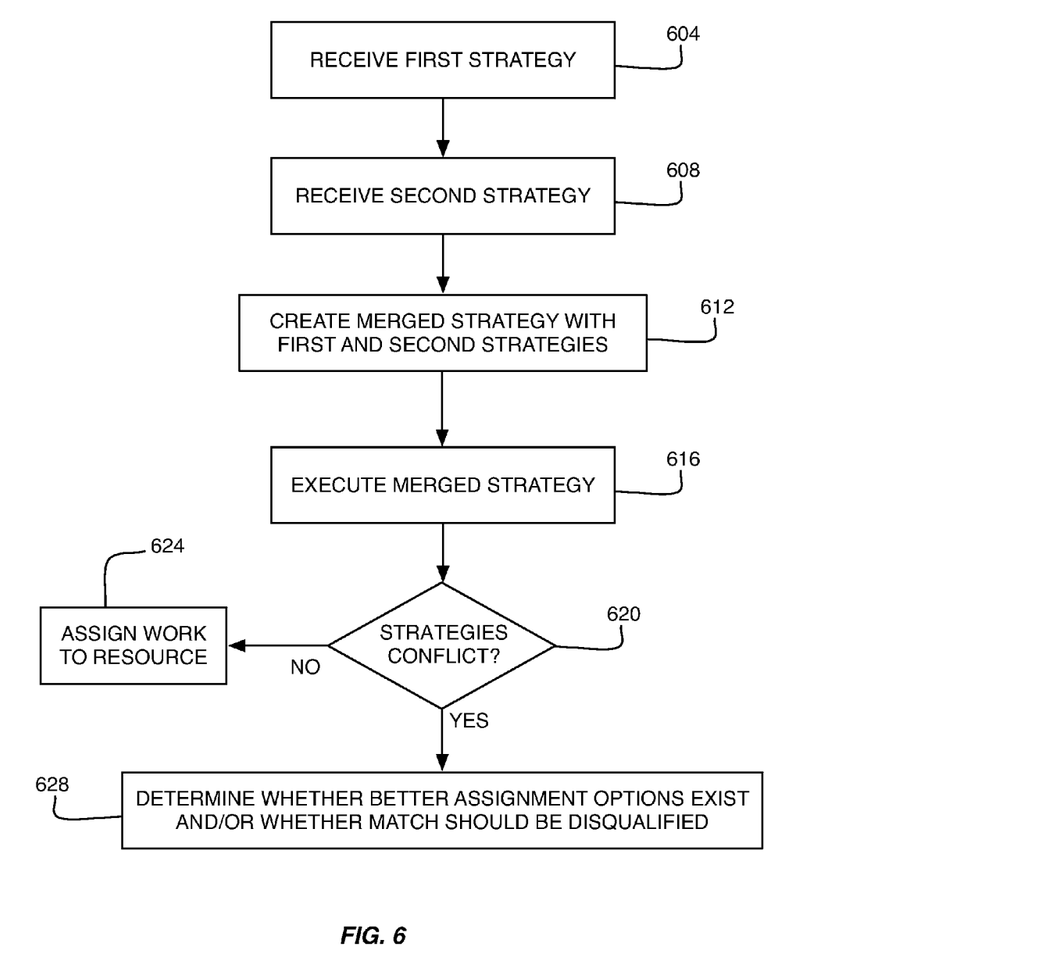
FIG. 6 depicts a strategy pairing method in accordance with embodiments of the present disclosure.

With reference now to FIG. 6, additional details of creating and executing a merged strategy 128, 412 will be described in accordance with at least some embodiments of the present disclosure. The method begins with the work assignment engine 120 receiving a first strategy (step 604) and a second strategy (step 608). As can be appreciated, the first strategy may correspond to an agent-finding-work strategy 404 and the second strategy may correspond to a work-finding-agent strategy 408.

The work assignment engine 120 creates a merged strategy 128, 412 by combining the first and second strategies (step 612). Thereafter, the work assignment engine 120 executes the merged strategy 128, 412 (step 616) to determine if there is a conflict between the strategies (step 620). Strategy contradiction may be detected by (i) executing the first strategy, (ii) checking to see if results of (i) contradict a condition in the second strategy, (iii) then executing the second strategy, and (iv) then checking to see if results of (iii) contradict a condition in the first strategy. As can be appreciated, steps 612, 616, and 620 may be performed in a qualification analysis to completely remove work/resource pairs from further consideration and/or in scoring analysis to lower scores of certain work/resources pairs due to their matching being in contradiction to at least one of the first and second strategies.

If the query of step 620 is answered negatively, then the work can be assigned to the selected resource because no contradiction in strategies has been detected (step 624). If, on the other hand, a strategy conflict is detected, then the method continues with the work assignment engine 120 determining whether better assignment options exist and/or whether the match should be disqualified (step 628). The work assignment engine 120 may look for other options but still keep the contradicting work/resource pair as an option if the analysis of step 620 occurred in the scoring phase of step 512. On the other hand, the work assignment engine 120 may remove the work/resource pair as a possible option if the analysis is performed in the qualification phase of step 508.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
receiving a first strategy at a work assignment engine;
receiving a second strategy at the work assignment engine, wherein the second strategy is different from the first strategy;
merging the first strategy with the second strategy to create a merged strategy; and
executing the merged strategy at the work assignment engine, wherein executing the merged strategy causes the work assignment engine to make a determination as to whether or not the first strategy conflicts with the second strategy by virtue of the strategy making a work assignment match between a work item and an agent in a contact center and the second strategy not making the same work assignment match between the work item and the agent.

2. The method of claim 1, wherein the first strategy corresponds to a work-finding-agent strategy and the second strategy corresponds to an agent-finding-work strategy.

3. The method of claim 2, wherein the merged strategy is executed during a qualification phase.

4. The method of claim 3, further comprising:
determining that the first strategy conflicts with the second strategy; and
in response to determining that the first strategy conflicts with the second strategy, disqualifying assignment of the work item to at least one agent in the contact center.

5. The method of claim 2, wherein the merged strategy is executed during a scoring phase.

6. The method of claim 5, further comprising:
determining that the first strategy conflicts with the second strategy; and
in response to determining that the first strategy conflicts with the second strategy, adjusting a matching score for a work item/agent pair in the contact center.

7. The method of claim 1, wherein the first strategy further comprises a rule set which defines one or more conditions associated with processing the plurality of tasks in the first set of executable tasks.

8. The method of claim 1, wherein executing the merged strategy comprises: (i) executing the first strategy, (ii) checking to see if results of executing the first strategy contradict a condition in the second strategy, (iii) executing the second strategy, and (iv) then checking to see if results of executing the second strategy contradict a condition in the first strategy.

9. The method of claim 1, wherein the first strategy comprises a rule set an a plurality of executable tasks, wherein the rule set defines one or more conditions associated with processing the plurality of tasks.

10. The method of claim 1, wherein the merged strategy is executed during compile time of the work assignment engine.

11. A non-transitory computer readable medium having stored thereon instructions that cause a computing system to execute a method, the instructions comprising:
   instructions configured to receive a first strategy at a work assignment engine;
   instructions configured to receive a second strategy at the work assignment engine, wherein the second strategy is different from the first strategy;
   instructions configured to merge the first strategy with the second strategy to create a merged strategy; and
   instructions configured to execute the merged strategy at the work assignment engine, wherein executing the merged strategy causes the work assignment engine to make a determination as to whether or not the first strategy conflicts with the second strategy by virtue of the first strategy making a work assignment match between a work item and an agent in a contact center and the second strategy not making the same work assignment match between the work item and the agent.

12. The computer readable medium of claim 11, wherein the first strategy corresponds to a work-finding-agent strategy and the second strategy corresponds to an agent-finding-work strategy.

13. The computer readable medium of claim 12, wherein the merged strategy is executed during a qualification phase of a work assignment decision.

14. The computer readable medium of claim 13, further comprising:
   instructions configured to determine that the first strategy conflicts with the second strategy and in response to determining that the first strategy conflicts with the second strategy, disqualify assignment of the work item to at least one agent in the contact center.

15. The computer readable medium of claim 12, wherein the merged strategy is executed during a scoring phase of a work assignment decision.

16. The computer readable medium of claim 15, further comprising:
   instructions configured to determine that the first strategy conflicts with the second strategy and in response to determining that the first strategy conflicts with the second strategy, adjust a matching score for a work item/agent pair in the contact center.

17. The computer readable medium of claim 12, wherein executing the merged strategy comprises: (i) executing the first strategy, (ii) checking to see if results of executing the first strategy contradict a condition in the second strategy, (iii) executing the second strategy, and (iv) then checking to see if results of executing the second strategy contradict a condition in the first strategy 18. A contact center, comprising:
   a work assignment engine configured to execute a merged strategy that comprises a plurality of individual strategies, each of the individual strategies comprising discrete tasks and one or more rules defining conditions for performing the discrete tasks, wherein execution of the merged strategy enables the work assignment engine to determine whether execution of one of the plurality of individual strategies results in a violation of a work-item-to-agent assignment condition in another of the plurality of individual strategies.

19. The contact center of claim 18, wherein the plurality of individual strategies comprise at least one agent-finding-work strategy and at least one work-finding-agent strategy.

20. The contact center of claim 18, executing the merged strategy comprises: (i) executing a first strategy, (ii) checking to see if results of executing the first strategy contradict a condition in a second strategy, (iii) executing the second strategy, and (iv) then checking to see if results of executing the second strategy contradict a condition in the first strategy.

* * * * *

UNITED STATES PATENT AND TRADEMARK OFFICE
CERTIFICATE OF CORRECTION

| | | |
|---|---|---|
| PATENT NO. | : 9,124,702 B2 | Page 1 of 1 |
| APPLICATION NO. | : 14/071368 | |
| DATED | : September 1, 2015 | |
| INVENTOR(S) | : Robert C. Steiner, Gene Masaru Uba and Michael Hartman | |

It is certified that error appears in the above-identified patent and that said Letters Patent is hereby corrected as shown below:

In the Claims:
At Column 12, line 28, after "by virtue of the" insert --first-- therein.

Signed and Sealed this
Nineteenth Day of January, 2016

Michelle K. Lee
*Director of the United States Patent and Trademark Office*